K. IMHOFF.
SETTLING TANK.
APPLICATION FILED SEPT. 28, 1910.
1,057,154. Patented Mar. 25, 1913.
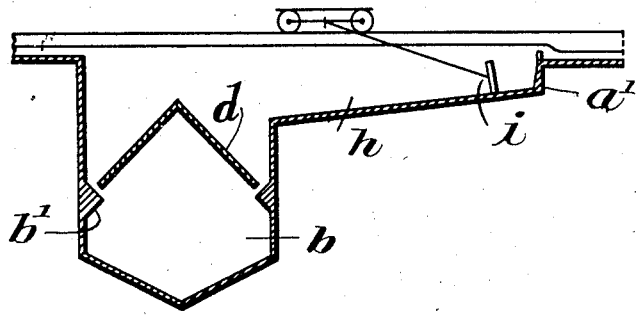

UNITED STATES PATENT OFFICE.

KARL IMHOFF, OF BREDENEY, NEAR ESSEN-ON-THE-RUHR, GERMANY.

SETTLING-TANK.

1,057,154.

Specification of Letters Patent.

Patented Mar. 25, 1913.

Application filed September 28, 1910. Serial No. 584,199.

*To all whom it may concern:*

Be it known that I, KARL IMHOFF, a subject of the German Emperor, and residing at Bredeney, near Essen-on-the-Ruhr, Germany, have invented certain new and useful Improvements in Settling-Tanks, of which the following is a specification.

My invention relates to settling tanks for the treatment of sewage.

In the sewage-treatment apparatus described in Letters Patent No. 924,664, granted to me heretofore, the decomposing chambers for the sludge are provided below the settling chambers traversed by the waste water. In all well-known makes of such apparatus for ordinary waste water the settling chambers are smaller than the decomposing chambers or sludge-basins and are arranged within or around the latter. It has been found, however, that this construction has various defects and is not adapted to be used satisfactorily in certain cases.

A primary object of my invention is to provide a settling tank by which these drawbacks are obviated, and to this end I make the settling chamber much larger than the decomposing chamber or sludge-well. The settling chamber cannot then be arranged within the decomposing chamber, but, reversely, the decomposing chamber is arranged as an addition to the settling chamber. Such an arrangement is necessary when the waste water is very thin and when but little sludge is deposited, or when it is desired that the sludge shall decompose to only a small extent, that is when the sludge is to be left in the decomposing chamber for only a short time.

The settling chamber can be enlarged relatively to the decomposing chamber, when both chambers are made, for example, in the form of wells or basins, by making the decomposing chamber of smaller diameter and arranging it at the bottom of the settling chamber.

An illustrative embodiment of my invention is represented by way of example in the accompanying drawing, which represents a vertical longitudinal section of my improved settling tank.

The settling chamber is made of larger diameter than the decomposing chamber or sludge-basin and of rectangular shape and longer or broader than the latter. It is provided with a sloping side, but as this cannot always be made sufficiently steep in all parts for the sludge to slide down automatically into the sludge-basin, scrapers have to be provided in order to push the sludge down from time to time. Such a settling tank is represented in the drawing. The settling chamber $a^1$ is here again located above the sludge-basin $b$. But as the gradient of the sloping bottom $h$ of the settling-chamber is not sufficiently great, the scraper $i$ is provided. The waste water flows in at the upper end of the settling-chamber and out at the opposite end. In this arrangement the shortest path for the water from the inlet to the outlet is located through the settling-chamber only and not through the sludge-basin, so that the sludge is deposited in the sludge-basin $b$.

The sludge-basin $b$ is provided with an inwardly-projecting sloping ledge $b^1$ and a cone-shaped deflector $d$ above the same, the lower edge of the deflector being separated by a short space from the ledge, as shown in the drawing.

I claim:

A settling tank comprising in combination a larger settling chamber having a slightly inclined bottom, a smaller sludge-basin or well below the settling chamber provided with an inwardly-projecting ledge, a conical deflector above said ledge, and means for scraping off the sludge from the inclined bottom of the settling chamber into the sludge-basin or well.

KARL IMHOFF. [L. S.]

Witnesses:
 WALTER VONNEGUT,
 ALFRED HENKEL.